United States Patent [19]
Jones

[11] 3,749,992
[45] July 31, 1973

[54] FAN CONTROL PANEL
[75] Inventor: Emery Benjamin Jones, Jacksonville, Fla.
[73] Assignee: American Coolair Corporation, Jacksonville, Fla.
[22] Filed: June 23, 1972
[21] Appl. No.: 265,508

[52] U.S. Cl. .............................. 318/452, 318/473
[51] Int. Cl. ........................................... H02p 3/00
[58] Field of Search ........................... 318/473, 452

[56] References Cited
UNITED STATES PATENTS
| | | | |
|---|---|---|---|
| 2,818,535 | 12/1957 | Skeats | 318/452 X |
| 3,382,331 | 5/1968 | Jencks et al. | 200/50 A |
| 2,697,195 | 12/1954 | Courtney, Jr. | 318/452 |
| 3,259,826 | 7/1966 | Paul | 318/473 X |

*Primary Examiner*—B. Dobeck
*Attorney*—John W. Malley, Allen Kirkpatrick et al.

[57] ABSTRACT

There has been provided a control for energizing an output device such as a fan motor in response to manual or condition sensitive means including: a first switching means responsive for enabling the motor when manually actuated. The first switching means has a relay with a stick circuit for coupling the actuating energy to the motor. The second switch means is responsively coupled to an output of the condition sensitive means and indicates the occurrence of a selected condition and is adapted when energized thereby for activating the first switch means. The second switch means includes a relay having a stick circuit for maintaining the activated condition regardless of the condition of said sensing means, while the stick circuit of the first switch means maintains activation thereof in response to only a momentary manual actuation. A master controller couples the source of activating energy to the motor when said first switch means has been actuated and a housing is adapted for receiving the control system and includes a door arrangement having a lever mounted thereon adapted for interlocking with the master controller for disabling the motor when actuated by said condition sensing means.

4 Claims, 3 Drawing Figures

3,749,992

FAN CONTROL PANEL

BACKGROUND OF THE INVENTION

The apparatus described herein relates to a control system and more specifically to a control circuit for operating a fan motor.

The fan control circuit developed and described herein was produced in order to provide a versatile, relatively inexpensive, and reliable exhaust fan control system which would be acceptable for use in a commercial or industrial application.

Fan controls may utilize the simple ON/OFF actuation of a motor which is coupled to the fan and simply activated by a manual switch. The most general use of such a fan is to provide an exhaust for accumulated warm air in a selected area; however, such a device may have numerable applications depending upon the needs of the consumer. Further, in certain areas where noxious gases and smoke may tend to accumulate, a fan of the type contemplated herein may be utilized to drive the accumulated gases out of the area or structure quite effectively.

It is desirable in many cases to provide an apparatus which may be operated automatically as, for example, by thermostatic control, and manually when desired due to situations which do not readily lend themselves to accurate measurement and control, for example, certain combinations of temperature, humidity and accumulated smoke and the like.

Further, such an apparatus might be used to activate a fan under certain alarm conditions, for example, in the event of a fire it is often imperative to exhaust the accmulated smoke as quickly as possible in order to find the source of the fire and readily extinguish it. A fan having a control circuit responsive to accumulated smoke could be adapted to operate the control circuit contemplated herein for accomplishing that purpose.

Likewise, a heat sensitive element responsive to a rapid change in ambient temperature or some maximum ambient could also be utilized to provide the exhaust fan with an activation signal.

It should be remembered, however, that often it is desirable to manually operate or actuate the fan mechanism in order to relieve discomfort due to excessive heat build-up in a particular area and this should be accomplished without activating any alarm and without the necessity for resetting as is usually the case with a condition sensitive apparatus when shut down of the fan is desired.

It is necessary, therefore, to provide a system which is more versatile than certain ones presently utilized in the art, for example, certain ones which do not permit manual operation, and certain others which provide more complicated resetting during the intial start up or shut down of such an exhaust fan apparatus.

It is therefore an object of the present invention to provide an apparatus which obviates one or more of the limitations and disadvantages of the described prior arrangements.

It is another object of the present invention to provide an apparatus which is versatile, reliable and relatively inexpensive to manufacture.

SUMMARY OF THE INVENTION

Figure 1:
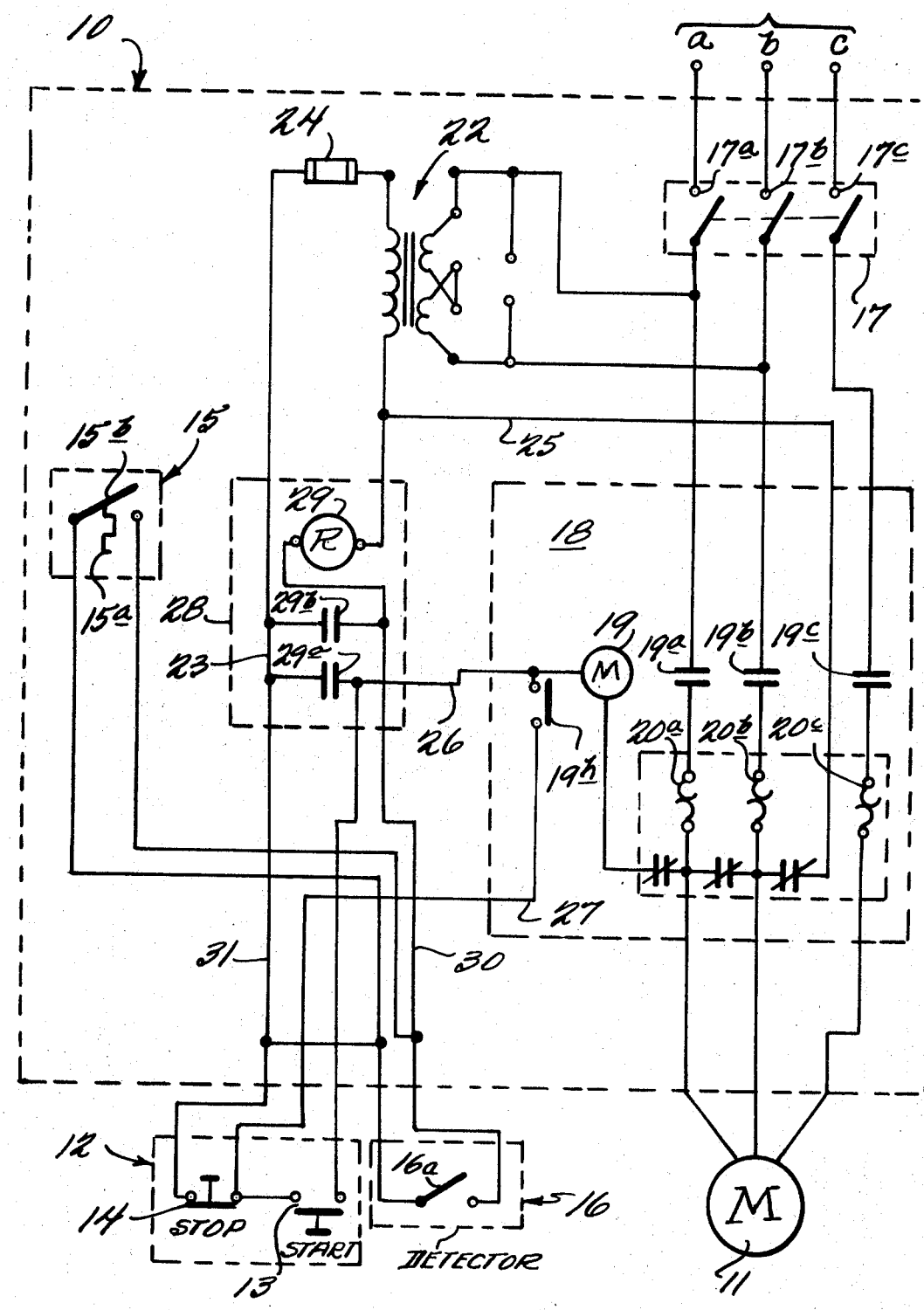
FIG. 1 is a schematic diagram of the control circuit of the present invention.

There has been provided a control for energizing an output device such as a fan motor in response to manual, or condition sensitive means including; a first switching means responsive for enabling the motor when manually actuated. The first switching means has a relay with a stick circuit for coupling the actuating energy to the motor. Second switch means is responsively coupled to an output of the condition sensitive means and indicates the occurrence of a selected condition and is adapted when energized thereby for activating the first switch means. The second switch means includes a relay having a stick circuit for maintaining the activated condition regardless of the subsequent condition of said sensing means, while the stick circuit of the first switch means maintains activation thereof in response to only a momentary manual actuation. A master controller couples the source of activating energy to the motor when said first switch means has been actuated and a housing is adapted for receiving the control system and includes a door arrangement having a lever mounted thereon adapted for interlocking with the master controller for disabling the motor when actuated by said condition sensing means.

For a better understanding of the present invention together with other and further objects thereof reference is directed to the following description taken in connection with the accompanying drawings while its scope will be pointed out in the appended claims.

DESCRIPTION OF THE PREFERRED EMBODIMENTS

The control system of the present invention is shown generally at 10 and includes apparatus for operating a motor 11 which may be used to drive an exhaust fan (not shown). The apparatus includes a manual actuator 12 having a start and stop switch respectively labeled 13 and 14. There is further included sensing means such as a thermostat 15 and a smoke or flow detector 16, each of which provide a signal when actuated for operating the motor as shall be explained further in the description.

The control system 10 further includes a master contactor 17 including switches 17a, b and c which in the present apparatus are utilized because a three-phase power supply is illustrated. It is possible, of course, to use a two-phase motor; however, in industrial applications, three-phase power is readily available and three-phase motors such as 11 may be more efficient, and thus, economical to adapt for such a purpose. A first switching means 18 is coupled between the motor 11 and the master contactor 17, and includes a relay 19 and associated contacts 19a, b and c, associated with the a, b and c input lines of the three-phase supply. The relay 19 also has associated therewith a holding or stick contact 19h, the purpose of which shall be explained further in discussion.

Further, there is included fused or circuit breaker 20 having contact breakers 20a, b and c associated with the respective lines for sensing current overload and providing for decoupling of the motor 11 from the power supply in the event of a bearing seizure or an inbalance in the power supply input.

In order to operate the motor 11 manually, it is necessary to switch the master contactor 17 to the ON condition coupling the power supply to the input of the first switching means 18. This is accomplished by actuating a lever 21 (shown in FIG. 2) to the ON condition thereby closing the switches 17a, b and c. Start button 13 is then depressed momentarily and couples a source of power with relay 19 energizing same and closing contacts 19a, b and c and also closing the hold, or stick contact 19h so that when the start button 13 is released, the relay 19 remains energized for maintaining the motor 11 in its energized condition. The power supply for the relay 19 is provided by transformer assembly 22 which is tapped off two of the legs of the input power supply; namely legs a and b and is suitably reduced to a voltage compatible to the relay 19.

A circuit can be traced from the start button 13 through the stop switch 14 along lead 23 through a circuit breaker or fuse 24 and the secondary of transformer 22, through lead 25 energizing the coil of relay 19 and then through lead 26 to the other side of the start button 13. The hold contact 19h couples the lead 26 with a lead 27 bypassing the start switch as soon as the relay 19 becomes energized, thereby holding the relay 19 energized utilizing the lead 27 and closed contact 19h as bypass for the start button.

In order to release the motor and de-energize the relay, the stop button is depressed open circuiting the relay 19 and thereby de-energizing or open circuiting the contacts 19a, b and c and contact 19h, thereby de-energizing motor 11.

The apparatus shown herein is equipped with thermostatic and smoke or flow detector as examples of the various possible control devices which may be utilized to operate or cause operation of the motor 11 under selected conditions. The smoke or flow switch 16 may be suitably adapted for detecting a certain level of combustion products or alternately, may be a flow switch adapted to detect a minimum flow rate which is or may be required for certain industrial purposes. The detector 16 when actuated closes its contact 16a and actuates a second switching means 28, which includes a relay 29 and associated contacts 29a and 29h. When the contact 16a in detector 16 closes, a path may be traced from the detector over a lead 30 through the relay 29 and the secondary of transformer 22 through the fuse 24 and lead 23 which is coupled by a crossover lead 31 to the other side of the smoke detector 16. This circuit causes energization of the relay 29 which closes its contacts 29a and 29h. The closure of 29h causes the relay to be stuck in its energized condition by completing a circuit through the relay 29 as previously described except that the contact 29h bypasses the smoke detector switch 16.

The contact 29a completes a circuit for energizing the relay 19 which in turn energizes the motor 11. The circuit can be traced from the contact 29a through lead 26 and relay 19 over lead 25 and the secondary of the transformer 22, fuse 24, lead 23 and back to the other side of the contact 29a. This arrangement provides for a holding of the motor 11 in an energized condition as long as relay 29 remains energized.

In accordance with the present invention, the relay 29 may be de-energized at this point by an opening of its stick circuit including contact 29h. To accomplish this the whole system must be de-energized by switching the master contactor 17 to OFF thereby de-energizing the transformer primary 22 and thus de-actuating the relay 29. This not only cuts off the motor supply, but also resets the relay 29 to enable it to respond to another condition at a later time. It should be noted in this connection that the smoke or flow detector 16 may become open circuit due to a change in the smoke or flow condition occasioned by the activation of the fan and it is intended that the motor remain running since the condition which occasioned the activation of the detector 16 might not necessarily be abated immediately and for a safety condition, it is beneficial to let the motor 11 run until reset by certain maintenance personnel.

Another condition sensitive device 15 is shown herein and consists of a thermostat 15A which governs the closure of a contact 15B. This contact operates simularly to the flow switch 16 and causes activation of the relay 29 as previously described.

Figure 2:
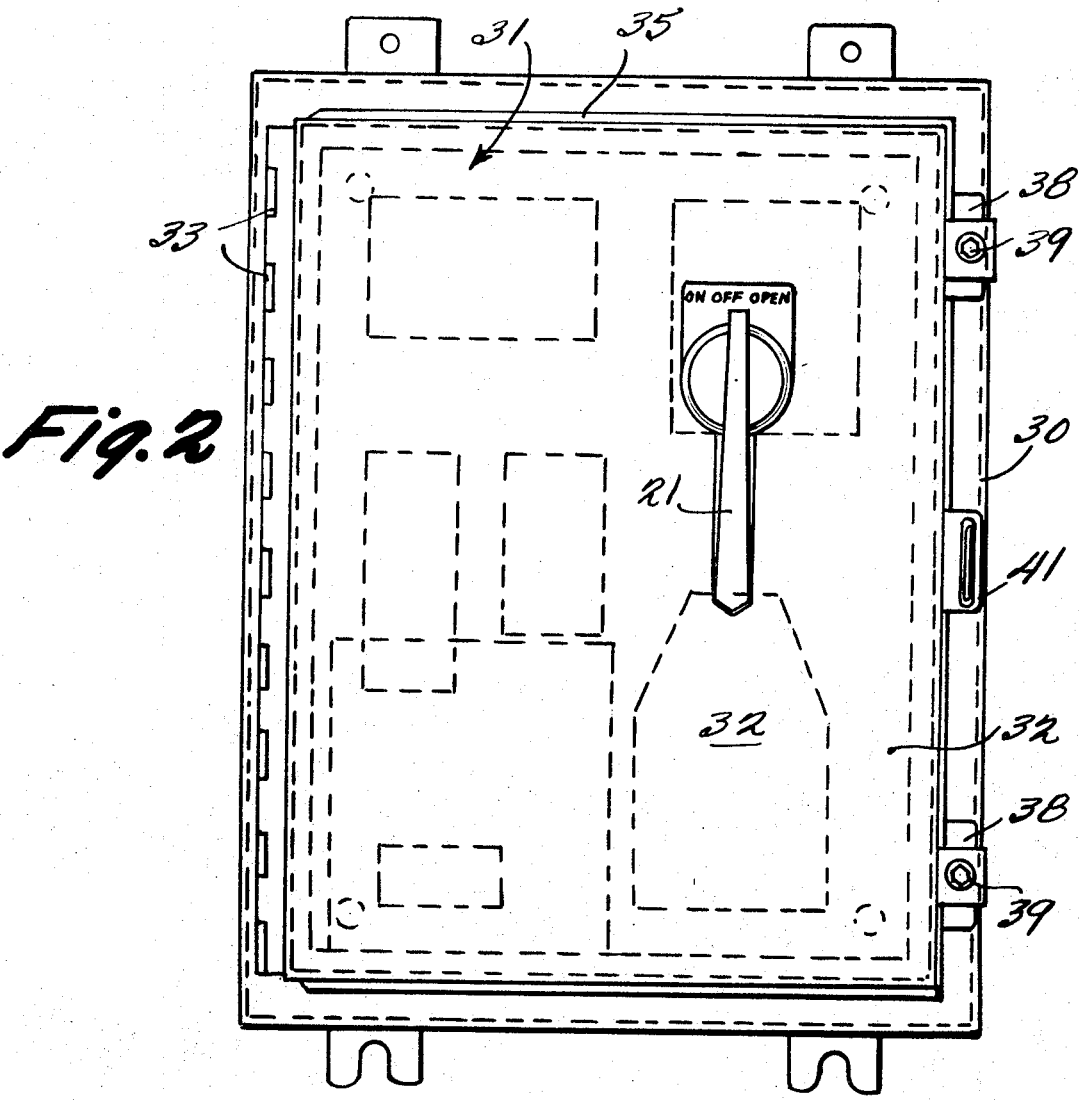
FIG. 2 is a top elevation showing the housing adapted to receive the control system of FIG. 1.

FIG. 2 shows a broken top view of the housing 30 used to receive the control system of FIG. 1. The housing 30 includes an opening therein 31 and a door 32 hinged appropriately at 33. The door 32 further has a flanged member 35 forming part of the hinge. The interior of the housing 30 has a flanged engaging member 36 which engages with the interior portion of the door 32. Further, the door has a sealing member 37 which is adapted to be fastened to the interior portion of the door 32 by some adhesive and it engages with the flanged portion 36 of the housing 30 so as to provide an adequate seal.

Lever 21 is adapted to be mounted through a hole 32', the door 32 and engages with an interior lever 17' which is a portion of the main contactor 17.

Figure 3:
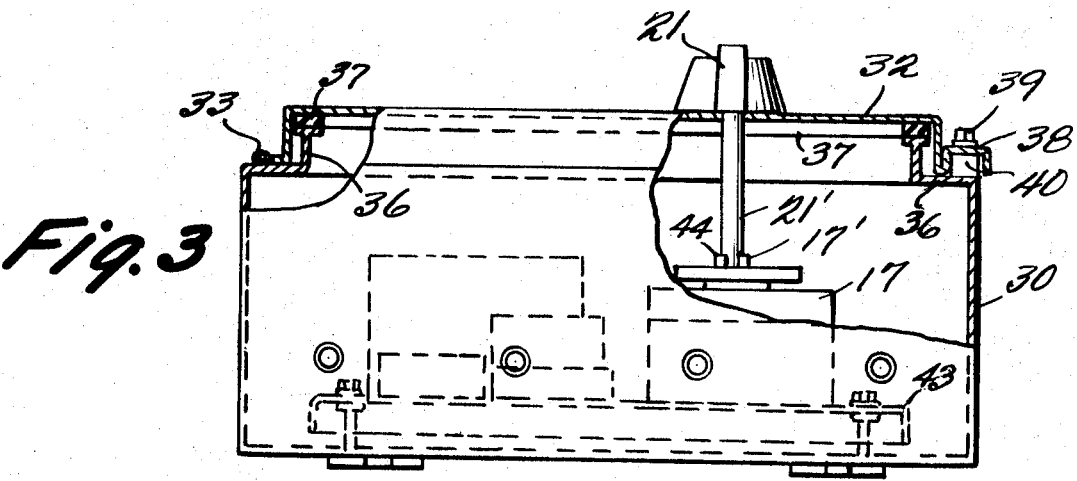
FIG. 3 is a side view of the illustration of FIG. 2.

The door 32 is secured to the housing 30 by locking or latching member 38, illustrated in FIG. 3, which includes a suitable bolt 39 and a spacer member 40 disposed between the housing 30 and the latching member 38. When bolted into place, the latching member 38 engages with the flanged member 35 and forces the lever 32 to engage with the sealing member 36 to suitably seal the housing 30. Further a latch and hasp 41 has been provided in order to permit the use of a locking device or other sealing device to prevent unauthorized access.

Component parts of the apparatus of FIG. 1 may be mounted on a mounting board 43 and in particular the contractor mechanism 17 is mounted on the board 43 so as to engage with an extending portion 21' of the controller lever 21 which is adapted to actuate the controller mechansim 17. When the door 32 is released the contractor lever 17' disengages with the controller lever 21' at the point 17. Door 32 is released only when lever 21 is in the open position. In this position the controller mechanism 17 is open-circuit and none of the wires within the panel beyond contractors 17a, b and c are electrically activated. Work performed on the components is therefore done in a non-hazardous fashion whenever the door 32 is open. In the preferred embodiment the fan cannot remain in any other previously established condition whenever the door 32 is open. Other types of door interlocks are possible, however, it was found that this particular type of safety feature was the most desirable in view of the various applications of the control panel described herein.

While there has been described what at present is considered to be the preferred embodiment of the present invention, it will be obvious to those skilled in the art that various changes and modifications may be made therein without departing from the invention. It is therefore aimed in the appended claims to cover all such changes and modifications as fall within the true spirit and scope of the invention.

What is claimed is:

1. A control for energizing an output device such as a fan motor in response to manual or condition sensitive means comprising: first switch means responsive to manual actuation for enabling said motor including a first relay coupled to a source of power and having contacts for coupling actuating energy to the motor, second switch means responsively coupled to an output of said condition sensitive means indicative of the occurrence of a selected condition and adapted when energized thereby, for activating said first switch means and including, a second relay having a stick circuit for maintaining said activated condition regardless of a subsequent condition of said sensing means;

said first relay including a stick circuit for maintaining activation of said first switch means in response to only a momentary manual actuation thereof;

a master contactor coupling the source of activating energy to said motor through said first switch means;

a housing adapted for receiving said control system including, a door arrangement and manual lever mounted thereto adapted for interlocking with said master control, and for disabling said first switch means if activated by said condition sensitive means and a manual switch means including a start and stop switch, said start and stop switch momentarily operated for activating said first switch means and bypassed by said stick circuit when said first relay is energized, said start and stop switch open circuiting said first switch means only when said second switch means is deactuated; and said master switch when selectively actuated to an OFF condition deactuating said first switch means when said second switch means is activated for decoupling the motor, whereby said motor may not be deenergized after actuation by said second switch means unless the master contactor is deactivated for decoupling the power from said control system.

2. The apparatus of claim 1, including a transformer adapted for connection with said activating power for providing a relatively low power supply for such first and second switch means.

3. The apparatus of claim 1, wherein said housing and door arrangement includes a hinged member integrally formed with said door for attachment with said housing, on one side of an opening therein; said housing further including a sealing member engaging with an interior portion of the door, said sealing member likewise engaging with the opening on the housing, said opening including a flanged member extending outwardly of the opening and engaging with the sealing member in the door.

4. The apparatus of claim 3, further including locking means removably mounted to the housing and engaging with the door member, including a U-shaped member, a bolt and a spacer and a flanged edge of said door, said U-shaped member engaging with the flange at a distance established by said bolt and spacer.

* * * * *